US009781668B2

(12) United States Patent
Yang et al.

(10) Patent No.: US 9,781,668 B2
(45) Date of Patent: Oct. 3, 2017

(54) METHODS AND APPARATUSES FOR CONFIGURING NUMBER OF ANTENNAS FOR MASSIVE MIMO COMMUNICATION

(71) Applicants: Hong Yang, Ledgewood, NJ (US); Thomas Marzetta, Summit, NJ (US)

(72) Inventors: Hong Yang, Ledgewood, NJ (US); Thomas Marzetta, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 19 days.

(21) Appl. No.: 14/707,801

(22) Filed: May 8, 2015

(65) Prior Publication Data
US 2016/0330681 A1    Nov. 10, 2016

(51) Int. Cl.
*H04W 72/00*    (2009.01)
*H04W 52/02*    (2009.01)
*H04B 7/0426*    (2017.01)

(52) U.S. Cl.
CPC ...... *H04W 52/0206* (2013.01); *H04B 7/0426* (2013.01); *Y02B 60/50* (2013.01)

(58) Field of Classification Search
CPC ............. H04W 52/0206; H04W 28/08; H04W 72/042; H04W 72/0473; H04B 7/0426
USPC .... 455/404.1, 412.1–414.2, 418–422.1, 436, 455/456.1, 456.2, 452.1, 552.1, 457, 451, 455/450, 509; 370/328–332, 338, 310.2, 370/348, 341, 342
See application file for complete search history.

(56) References Cited

U.S. PATENT DOCUMENTS

| | | | | |
|---|---|---|---|---|
| 6,611,675 B1 * | 8/2003 | Salonen | ............... | H04B 7/0634 455/562.1 |
| 7,574,236 B1 * | 8/2009 | Mansour | ............... | H04B 7/0413 455/562.1 |
| 8,559,877 B2 * | 10/2013 | Kusano | ................ | H04B 7/0617 455/105 |
| 8,577,303 B2 * | 11/2013 | Hwang | ................ | H04B 7/0808 370/332 |
| 8,843,167 B2 * | 9/2014 | Lee | ....................... | H04B 7/0404 370/310 |
| 2010/0062757 A1 * | 3/2010 | Reina | ................ | H04W 52/0216 455/424 |
| 2010/0304773 A1 * | 12/2010 | Ramprashad | .......... | H04B 7/024 455/509 |
| 2012/0207145 A1 * | 8/2012 | Han | ....................... | H04B 7/024 370/342 |
| 2013/0010632 A1 * | 1/2013 | Wang | .................... | H04B 17/309 370/252 |
| 2013/0203430 A1 * | 8/2013 | Gan | ....................... | H04W 48/18 455/450 |
| 2014/0073337 A1 * | 3/2014 | Hong | .................... | H04W 16/28 455/452.1 |

(Continued)

*Primary Examiner* — Babar Sarwar
(74) *Attorney, Agent, or Firm* — Harness, Dickey & Pierce, P.L.C.

(57) ABSTRACT

A central node of a Massive Multiple-Input-Multiple-Output (MIMO) system includes a processor and a transceiver. The processor is configured to determine a number of active antennas to be used to serve users in at least one cell of the Massive MIMO system based on wireless network parameters for the Massive MIMO system. The transceiver is configured to transmit the determined number of active antennas to a Massive MIMO base station in the at least one cell.

23 Claims, 5 Drawing Sheets

(56) References Cited

U.S. PATENT DOCUMENTS

2014/0187174 A1\* 7/2014 Safavi .................. H04B 7/0413
　　　　　　　　　　　　　　　　　　　　　　　455/73
2016/0128023 A1\* 5/2016 Gustavsson .......... H04B 17/382
　　　　　　　　　　　　　　　　　　　　　　　370/329

\* cited by examiner

FIG. 5

METHODS AND APPARATUSES FOR CONFIGURING NUMBER OF ANTENNAS FOR MASSIVE MIMO COMMUNICATION

BACKGROUND

Field of the Disclosure

Example embodiments relate to methods, apparatuses and computer readable storage mediums for configuring numbers of antennas for Massive Multi-Input Multi-Output (MIMO) systems.

Description of the Related Art

A Massive MIMO system is capable of achieving relatively high spectral and energy efficiency through the use of a relatively large number of small service antennas, each of which serves a relatively small number of autonomous users. Conventionally, the number of antennas that maximizes total energy efficiency of a Massive MIMO system is determined via a brute-force search. However, this methodology consumes a relatively large amount of time and resources.

SUMMARY

One or more example embodiments provide methods and/or apparatuses for determining a number (e.g., an optimal number) of active antennas to be used at each Massive Multiple-Input-Multiple-Output (MIMO) base station to improve and/or maximize total cell energy efficiency of a power-controlled multi-cell Massive MIMO system. According to one or more example embodiments, the same or substantially the same number of antennas may be activated and utilized at each Massive MIMO base station with relatively little (or without) loss in energy efficiency due to the flatness of energy efficiency function.

At least one example embodiment provides a method for configuring a number of active antennas to be used to serve users in at least one cell of a Massive Multiple-Input-Multiple-Output (MIMO) system, the method including: determining, at a central node, the number of active antennas to be used to serve the users in the at least one cell of the Massive MIMO system based on wireless network parameters for the Massive MIMO system; and transmitting, by the central node, the determined number of active antennas to a Massive MIMO base station in the at least one cell.

At least one other example embodiment provides a central node of a Massive Multiple-Input-Multiple-Output (MIMO) system, the central node including: a processor configured to determine a number of active antennas to be used to serve users in at least one cell of the Massive MIMO system based on wireless network parameters for the Massive MIMO system; and a transceiver configured to transmit the determined number of active antennas to a Massive MIMO base station in the at least one cell.

At least one other example embodiment provides a non-transitory computer-readable medium including computer-executable instructions that, when executed by a computer device, cause the computer device to perform a method for configuring a number of active antennas to be used to serve users in at least one cell of a Massive Multiple-Input-Multiple-Output (MIMO) system, the method including: determining, at a central node, the number of active antennas to be used to serve the users in the at least one cell of the Massive MIMO system based on wireless network parameters for the Massive MIMO system; and transmitting, by the central node, the determined number of active antennas to a Massive MIMO base station in the at least one cell.

According to at least some example embodiments, the wireless network parameters may include at least one of fading characteristics for the Massive MIMO base station and traffic loading information for the Massive MIMO system. The fading characteristics may include slow fading coefficients associated with the Massive MIMO base station. The traffic loading information may include traffic loading demand for Massive MIMO base stations in the Massive MIMO system.

According to at least some example embodiments, the Massive MIMO system may include a plurality of cells and a plurality of corresponding Massive MIMO base stations. An estimated number of active antennas for serving users in each of the plurality of cells may be calculated based on the wireless network parameters for the Massive MIMO system; and the number of active antennas to be used for serving users in the at least one cell of the Massive MIMO system may be computed based on the estimated numbers of active antennas. The number of active antennas to be used for serving users in the at least one cell of the Massive MIMO system may be computed by calculating an average of the estimated numbers of active antennas. The calculated average may be transmitted to each of the plurality of cells in the Massive MIMO system.

According to at least some example embodiments, the number of active antennas to be used to serve users in the at least one cell may be dynamically adjusted by performing the determining step and the transmitting step periodically.

BRIEF DESCRIPTION OF THE DRAWINGS

The present disclosure will become more fully understood from the detailed description given herein below and the accompanying drawings, wherein like elements are represented by like reference numerals, which are given by way of illustration only and thus are not limiting of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, devices and/or systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: Massive Multiple-Input-Multiple-Output (MIMO) network elements, such as Massive MIMO central nodes, Massive MIMO base stations, etc. Such existing hardware may include one or more Central Processing Units (CPUs), system-on-chip (SOC) devices, digital signal processors (DSPs), application-specific-integrated-circuits (ASICs), field programmable gate arrays (FPGAs), computers, or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "Massive MIMO base station" may be considered synonymous to, and may hereafter be occasionally referred to as a base station, NodeB, eNodeB, eNB, transceiver station, base transceiver station (BTS), etc. A Massive MIMO base station provides wireless resources for users within a geographical coverage area (also referred to as a cell). As discussed herein, the Massive MIMO base station may have all functionally associated with conventional Massive MIMO base stations in addition to the capability and functionality to perform the methods discussed herein.

The term "user" as discussed herein, may be considered synonymous to, and may hereafter be occasionally referred to, as user equipment (UE), client, mobile unit, mobile station, mobile user, mobile, subscriber, user, remote station, access terminal, receiver, etc., and describes a remote user of wireless resources in a wireless communications network, such as a massive MIMO network.

As used herein, the term "central node" is a Massive MIMO network entity that controls a plurality of Massive MIMO base stations. The central node may be a separate network entity at one level higher hierarchical order than the Massive MIMO base stations, or may reside within a particular Massive MIMO base station. As discussed herein, the central node may have all functionally associated with conventional massive MIMO central nodes in addition to the capability and functionality to perform the methods discussed herein.

According to example embodiments, existing Massive MIMO base stations, Massive MIMO central nodes, etc., may be (or include) hardware, firmware, hardware executing software or any combination thereof. Such hardware may include one or more CPUs, SOC devices, DSPs, ASICs, FPGAs, computers, or the like, configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein Massive MIMO base stations, massive MIMO central nodes, etc., may be implemented as any physical computer hardware system including one or more processors, various interfaces, a computer readable medium, and (optionally) a display device. The one or more interfaces may be configured to transmit/receive (wireline or wirelessly) data signals to/from one or more other network elements or users; and to transmit/receive (wireline or wirelessly) control signals to/from other network elements or users. In at least one example, the functionality of the existing Massive MIMO base stations, Massive MIMO central nodes, etc., may be executed on the one or more processors and the various interfaces.

Figure 1:
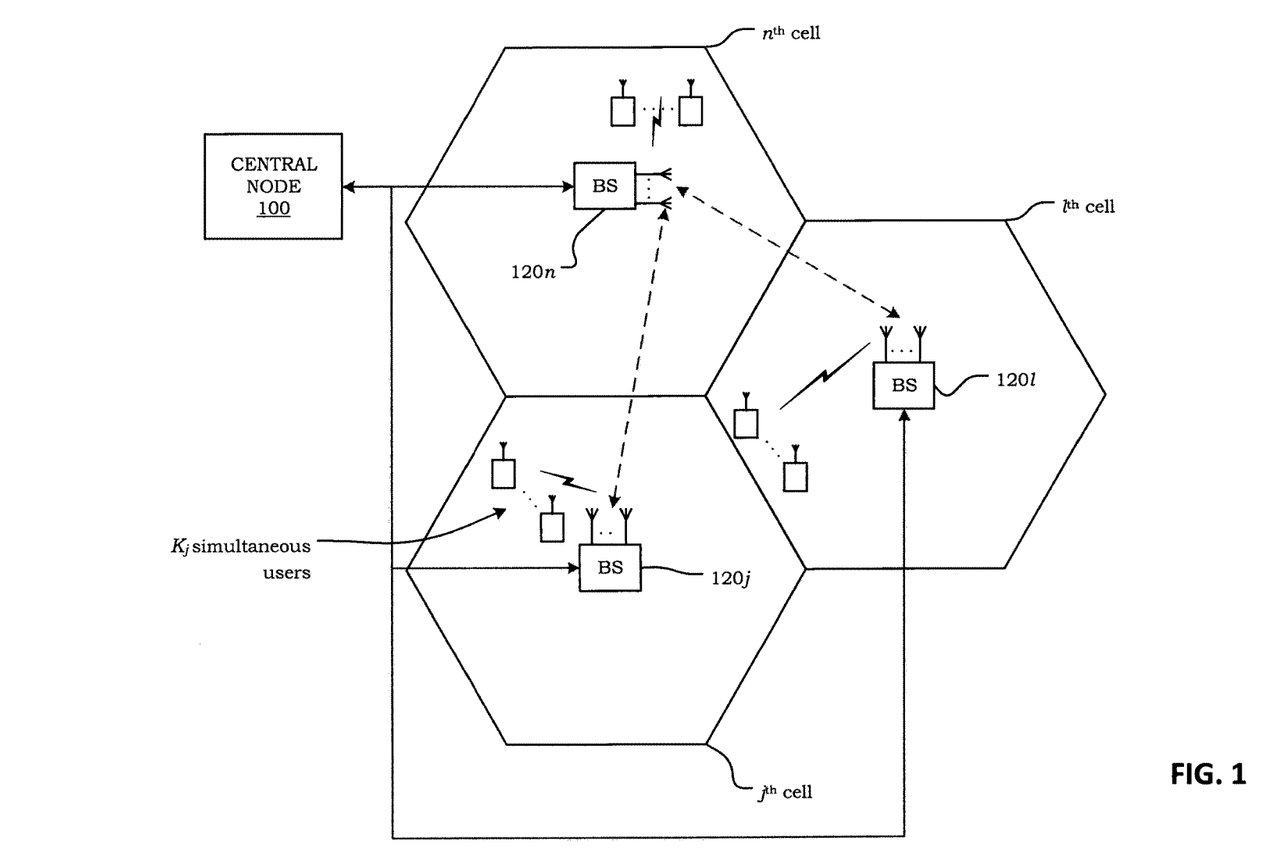
FIG. 1 illustrates a portion of a Massive Multiple-Input-Multiple-Output (MIMO) system.

FIG. 1 illustrates a portion of a Massive MIMO system. The system shown in FIG. 1 includes three Massive MIMO base stations $120n$, $120j$ and $120l$. However, it should be understood that a Massive MIMO system may include any number of base stations. For example purposes, the portion of the Massive MIMO network shown in FIG. 1 may sometimes be referred to as a cluster of Massive MIMO base stations including J number of Massive MIMO base stations and cells. A cluster of Massive MIMO base stations refers to a set or group of neighboring Massive MIMO base stations in a geographical area. As discussed herein, Massive MIMO base stations may also be referred to as base stations.

Referring to FIG. 1, each of the base stations $120n$, $120j$ and $120l$ serves users by providing wireless resources for users within the base station's respective geographical coverage area (also referred to as a cell). In more detail, Massive MIMO base station $120n$ provides wireless resources to users in the $n^{th}$ cell; Massive MIMO base station $120l$ provides wireless resources to users in the $l^{th}$ cell; and Massive MIMO base station $120j$ provides wireless resources to users in the $j^{th}$ cell.

Each of the plurality of Massive MIMO base stations $120n$, $120j$ and $120l$ is operatively coupled to a Massive MIMO central node 100 via a wired or wireless connection.

The Massive MIMO central node 100 controls the plurality of base stations $120n$, $120j$ and $120l$. As mentioned above, the Massive MIMO central node 100 may be a separate network entity at one level higher hierarchical order than the Massive MIMO base stations, or may reside within a particular Massive MIMO base station.

In a cellular or wireless network with multiple Massive MIMO base stations, the performance of each Massive MIMO base station in a cluster depends on operating states of neighboring Massive MIMO base stations. A central node, such as the central node 100 shown in FIG. 1, provides the necessary coordination among a cluster of Massive MIMO base stations so as to allow for adequate (and/or improved) network performance.

Figure 2:
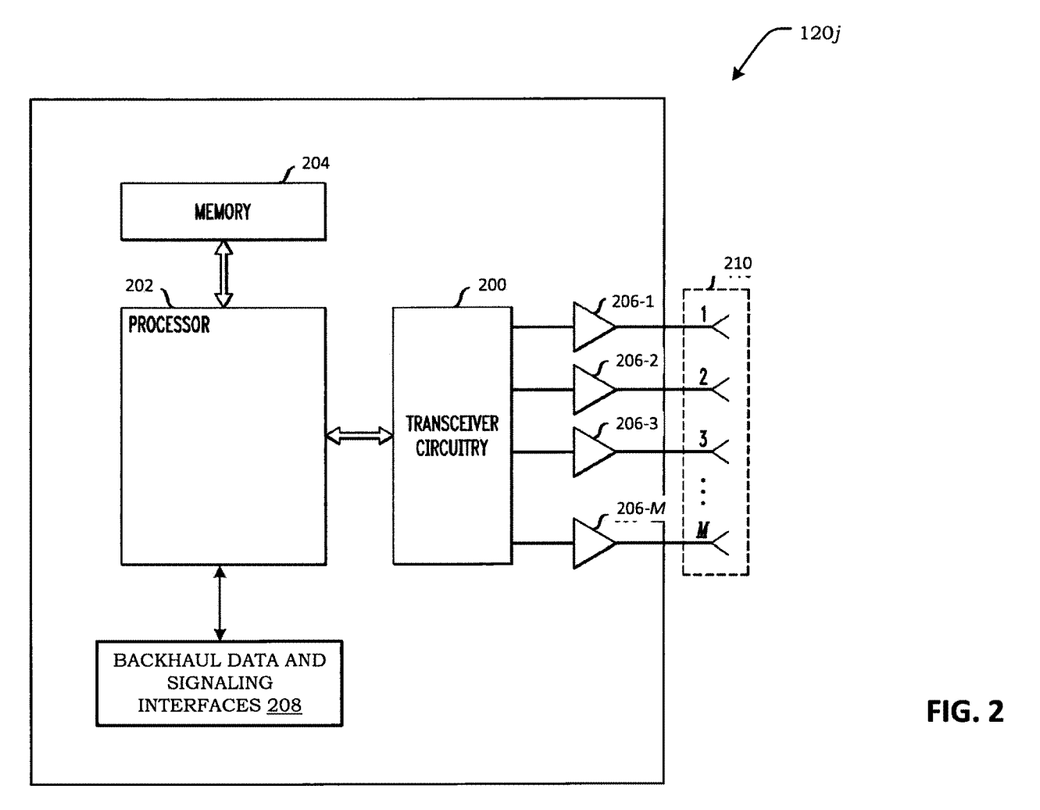
FIG. 2 is a block diagram illustrating an example embodiment of the Massive MIMO base station shown in FIG. 1.

FIG. 2 is a block diagram illustrating an example embodiment of the massive MIMO base station $120j$ shown in FIG. 1.

Referring to FIG. 2, the base station $120j$ includes: transceiver circuitry 200; a processor (or processing circuit) 202; a memory 204; and backhaul data and signaling interfaces 208.

The processor 202 controls the function of base station $120j$ (as described herein), and is operatively coupled to the memory 204, the transceiver circuitry 200, and the backhaul data and signaling interfaces 208. While only one processor 202 is shown in FIG. 2, it should be understood that multiple processors (or pools of processors) may be included in a typical base station, such as the base station $120j$. The functions performed by the processor may be implemented using hardware. As discussed above, such hardware may include CPUs, DSPs, ASICs, FPGAs, computers, or the like. The term processor or processing circuit used throughout this document may refer to any of these example implementations, though the term should not be limited to these examples.

Still referring to FIG. 2, the transceiver circuitry 200 (also referred to as a transceiver or communication interface) is further coupled to M antennas of a Massive MIMO antenna array (also sometimes referred to herein as a "Large-Scale Antenna Array") 210 via respective power amplifiers 206-1, 206-2, . . . , 206-M. Because functions of transceiver circuitry, power amplifiers and antennas are generally well-known, a detailed discussion of these components is omitted. A given Massive MIMO antenna array may include a few tens (e.g., 60) to a few hundreds (e.g., 250), or even a few thousand (e.g., 3000) of antennas depending on space.

The backhaul data and signaling interfaces 208 interface with other parts of the wireless network, such as the backhaul (e.g., Internet Protocol (IP) or core) network.

The memory 204 may buffer and store data that is being processed at the base station $120j$, transmitted and received to and from base station $120j$. The memory 204 may also store computer program instructions for controlling operation of the base station $120j$.

The memory 204 may be a computer readable storage medium that generally includes a random access memory (RAM), read only memory (ROM), and/or a permanent mass storage device, such as a disk drive. The memory 204 also stores an operating system and any other routines/modules/applications for providing the functionalities of the base station $120j$ (e.g., functionalities of a Massive MIMO base station, methods according to the example embodiments, etc.) to be executed by the processor 202. These software components may also be loaded from a separate computer readable storage medium into the memory 204 using a drive mechanism (not shown). Such separate computer readable storage medium may include a disc, tape, DVD/CD-ROM drive, memory card, or other like computer readable storage medium (not shown). In some embodiments, software components may be loaded into the memory 204 via one or more interfaces (not shown), rather than via a computer readable storage medium.

Although only Massive MIMO base station 120*j* is described in detail, each of the Massive MIMO base stations 120*l* and 120*n* may be the same or substantially the same as the base station 120*j* shown in FIG. 2. Accordingly, a detailed discussion of each of these Massive MIMO base stations will be omitted.

As will be appreciated, depending on implementation, the Massive MIMO base stations 120*l*, 120*j* and 120*n* may include additional components other than those shown in FIG. 2. However, it is not necessary that all of these generally conventional components be shown in order to convey illustrative example embodiments to persons having ordinary skill in the art.

Figure 3:
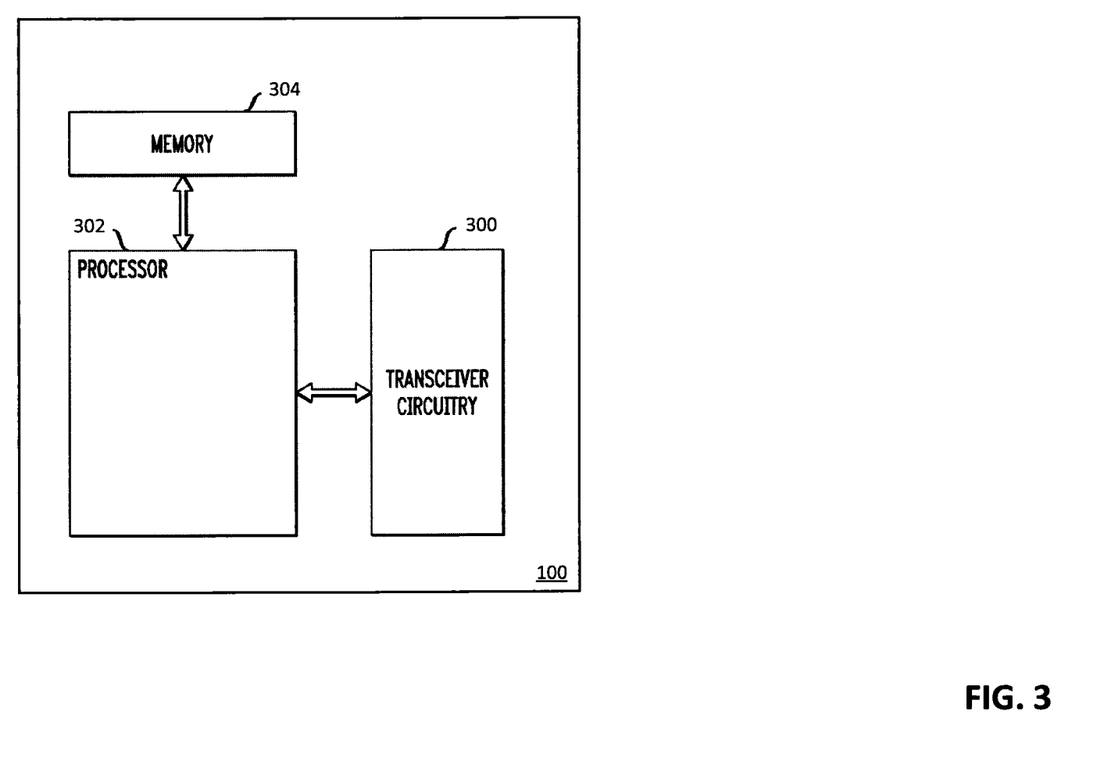
FIG. 3 is a block diagram illustrating an example embodiment of the Massive MIMO central node shown in FIG. 1.

FIG. 3 illustrates an example embodiment of the central node 100 shown in FIG. 1.

Referring to FIG. 3, the central node includes: a memory 304; a processor (or processing circuit) 302; and transceiver circuitry 300. The processor or processing circuit 302 controls the function of the central node 100 (as described herein), and is operatively coupled to the memory 304 and the transceiver circuitry 300. While only one processor 302 is shown in FIG. 3, it should be understood that multiple processors may be included in a typical central node, such as the central node 100. The functions performed by the processor 302 may be implemented using hardware and software. As discussed above, such hardware may include one or more CPUs, DSPs, ASICs, FPGAs, computers, or the like. As mentioned above, the term processor or processing circuit used throughout this document, may refer to any of these example implementations, though the term is not limited to these examples.

Still referring to FIG. 3, the transceiver circuitry 300 (also referred to as a transceiver or communication interface) may include various interfaces including one or more transmitters/receivers (or transceivers) connected to one or more antennas to wirelessly transmit/receive control and data signals to/from Massive MIMO base stations 120*j*, 120*l* and/or 120*n*, as well as other network elements.

The memory 304 may buffer and store data that is being processed at central node 100, transmitted and received to and from central node 100.

According to at least some example embodiments, the memory 304 may be a computer readable storage medium that generally includes a random access memory (RAM), read only memory (ROM), and/or a permanent mass storage device, such as a disk drive. The memory 304 also stores an operating system and any other routines/modules/applications for providing the functionalities of the central node 100 (e.g., functionalities and/or methods according to the example embodiments, etc.) to be executed by the processor 302. These software components may also be loaded from a separate computer readable storage medium into the memory 304 using a drive mechanism (not shown). Such separate computer readable storage medium may include a disc, tape, DVD/CD-ROM drive, memory card, or other like computer readable storage medium (not shown). In some embodiments, software components may be loaded into the memory 304 via one or more interfaces (not shown), rather than via a computer readable storage medium.

As will be appreciated, depending on the implementation, the central node 100 may include components in addition to those shown in FIG. 3. However, it is not necessary that all of these generally conventional components be shown in order to convey illustrative example embodiments to persons having ordinary skill in the art.

According to one or more example embodiments, to maximize the overall network energy efficiency in a Massive MIMO system, a central node calculates a number (e.g., an optimal number) of active antennas for use by Massive MIMO base stations in the Massive MIMO system based on overall wireless network parameters. The overall wireless network parameters may include fading characteristics and/or parameters (such as, e.g., slow fading coefficients) for the Massive MIMO base stations in the cluster, traffic loading information (e.g., traffic loading demand) for all base stations in the cluster, etc. The overall wireless network parameters and information associated therewith may be reported to the central node by the Massive MIMO base stations in the Massive MIMO system (e.g., periodically) via any known control channel (either wired or wireless).

According to one or more example embodiments, the massive MIMO system may refer to a cluster of massive MIMO base stations located in a given geographical coverage area (e.g., located relatively close to one another geographically).

In at least one example embodiment, the central node calculates the average of calculated optimal numbers of antennas for the Massive MIMO base stations in the cluster, and communicates the calculated average to each of the Massive MIMO base stations.

In response to receiving the calculated optimal number of antennas from the central node, each Massive MIMO base station activates the number of antennas communicated by the central node. The Massive MIMO base stations may active the antennas in any well-known manner.

The central node may adjust the number of active antennas at each Massive MIMO base station dynamically to improve (e.g., maximize) energy efficiency of the network.

According to at least some example embodiments, the central node may calculate an optimal number of active antennas for the Massive MIMO base stations periodically (e.g., every few minutes for fast moving users, a few tens of minutes for slow moving users, etc.). In another example, the central node may calculate the optimal number of active antennas in response to a substantial change in slow fading conditions for the Massive MIMO base stations, which depends on the mobility of the users in the network. In at least one example embodiment, a substantial change in slow fading conditions may occur when a user moves a substantial distance away from its original position. Depending on a user's surroundings, the substantial distance may be a few meters to a few hundred meters. In another example, a substantial change in slow fading conditions may occur when a large nearby object (e.g., a truck) moves away from a user.

Although example embodiments may be described, in at least some cases, with regard to a single one of the base stations shown in FIG. 1, it should be understood that each of the base stations may operate in the same or substantially the same manner.

Figure 4:
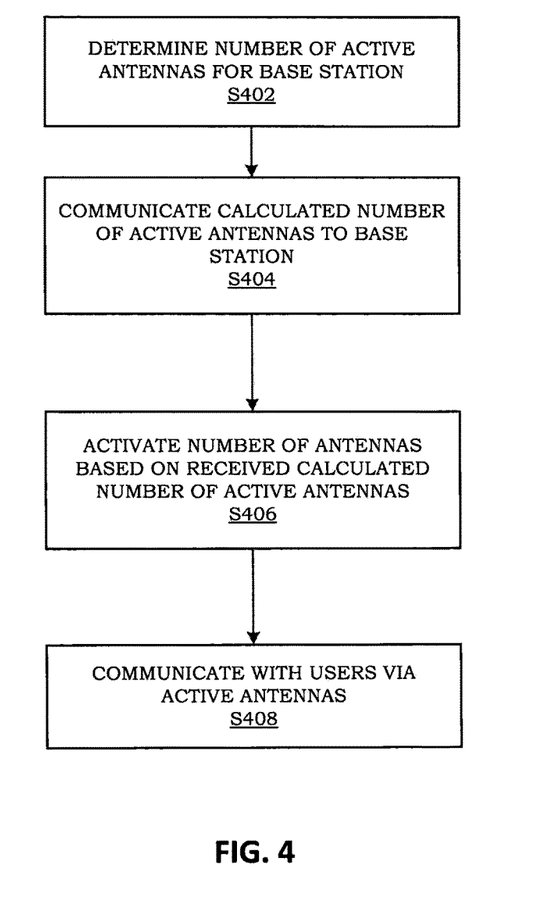
FIG. 4 is a flow chart illustrating an example embodiment of a method for determining a number of active antennas to be used at a Massive MIMO base station in a Massive MIMO system.

FIG. 4 is a flow chart illustrating an example embodiment of a method for determining a number of active antennas to be used at a Massive MIMO base station in a Massive MIMO system. For example purposes, the example embodiment shown in FIG. 4 will be discussed with regard to the $j^{th}$ base station 120*j* in FIGS. 1 and 2, and the central node 100 shown in FIGS. 1 and 3. Additionally, for the sake of this discussion, the base station 120*j* is assumed to serve $K_j$ simultaneous users. Similarly, the base station 120*l* is assumed to serve $K_l$ simultaneous users, and the base station $120n$ is assumed to serve $K_n$ simultaneous users.

Referring to FIG. 4, at step S402 the processing circuit 302 at the central node 100 determines a number of active antennas to be used at the $j^{th}$ Massive MIMO base station 120$j$ for serving the $K_j$ simultaneous users. In a more detailed example, the central node 100 calculates an optimal number of active antennas $M_j$ to be used at the Massive MIMO base station 120$j$. The central node 100 may calculate the number of active antennas for the base station 120$j$ using algorithms based on conjugate beamforming or zero-forcing, each of which will be discussed in more detail below.

According to at least one example embodiment, for each of the zero-forcing and conjugate beamforming cases, the central node 100 calculates the number (e.g., optimal number) of active antennas $M_j$ to be used by the Massive MIMO base station 120$j$ according to Equation (1) shown below.

$$M_j = b + \sqrt{a} \qquad (1)$$

In the conjugate beamforming case, the processor 302 may calculate 'a' in Equation (1) according to Equation (2) shown below:

$$a = \frac{SINR^{cb} \cdot N_0 \cdot A}{B^{cb}} \sum_{k=1}^{K} \frac{1}{\gamma_{jk}}. \qquad (2)$$

The processor 302 may calculate 'b' in Equation (1) according to Equation (3) shown below:

$$b = SINR^{cb} \sum_{k=1}^{K} \frac{\beta_{j:lk}}{\gamma_{jk}}. \qquad (3)$$

In Equations (2) and (3), $SINR^{cb}$ is the target signal-to-noise-plus-interference ratio for the $j^{th}$ cell; $N_0$ is the effective noise power at the $k^{th}$ user (among the $K_j$ simultaneous users) in the $j^{th}$ cell; A is a power parameter (discussed below); $B^{cb}$ is the per-antenna power cost other than radiated power for the $j^{th}$ cell; $\beta_{j:lk}$ is the slow fading between Massive MIMO base station 120$j$ and the $k^{th}$ user served by the base station 120$l$ in the $l^{th}$ cell, and $\gamma_{jk}$ is the expected power of the channel estimate for the channel from $k^{th}$ user in the $j^{th}$ cell to the antenna array at the Massive MIMO base station 120$j$. In one example, the processor 302 calculates the expected power $\gamma_{jk}$ according to Equation (4) shown below. In this example, K is the number of simultaneous users in the $j^{th}$ cell (i.e., $K_j$).

$$\gamma_{jk} = \frac{\rho_u \tau_u \beta_{j:jk}^2}{1 + \rho_u \tau_u \beta_{j:jk}} \qquad (4)$$

In Equation (4), $\rho_u$ is the normalized uplink Signal-to-Noise Ratio (SNR) with respect to uplink noise power at the Massive MIMO base station 120$j$, and $\tau_u$ is the length of the uplink pilots in the $j^{th}$ cell.

The processor 302 may calculate the effective noise power $N_0$ at the $k^{th}$ user in the $j^{th}$ cell according to Equation (5) shown below:

$$N_0 = N_{th} + NF_{MS} - Gain_{BS} - Gain_{MS} \qquad (5).$$

In Equation (5), $N_{th}$ is the thermal noise power in dBm, $NF_{MS}$ is the noise at the user in dB; $Gain_{BS}$ is the antenna gain of one service antenna at the Massive MIMO base station 120$j$; and $Gain_{MS}$ is the user antenna gain.

Still referring to Equations (2) and (3), the processor 302 may calculate the power parameter A based on a power efficiency parameter $$\frac{1}{2\varepsilon_p}$$

and a power scaling factor $$\left(1 - \frac{\tau_u}{T}\right).$$

The power efficiency parameter $$\frac{1}{2\varepsilon_p}$$

may be calculated based on the efficiency $\varepsilon_p$ of the radio-frequency amplifier at the Massive MIMO base station 120$j$. The power scaling factor $$\left(1 - \frac{\tau_u}{T}\right)$$

may be calculated based on the uplink pilot length $\tau_u$ as well as the length of the coherence interval T. In a more specific example, the processor 302 may calculate the power parameter A according to Equation (6) shown below:

$$A = \frac{1}{2\varepsilon_p}\left(1 - \frac{\tau_u}{T}\right). \qquad (6)$$

In the zero-forcing case, the processor 302 may calculate 'a' in Equation (1) according to Equation (7) shown below:

$$a = \frac{SINR^{zf} \cdot N_0 \cdot A}{B^{zf}} \sum_{k=1}^{K} \frac{1}{\gamma_{jk}}. \qquad (7)$$

The processor 302 may calculate 'b' in Equation (1) according to Equation (8) shown below:

$$b = K + SINR^{zf}\left(\sum_{k=1}^{K} \frac{\beta_{j:lk}}{\gamma_{jk}} - K\right). \qquad (8)$$

In Equations (7) and (8), $SINR^{zf}$ is the target signal-to-noise-plus-interference ratio for the $j^{th}$ cell, and $B^{zf}$ is the per-antenna power cost other than radiated power for the $j^{th}$ cell. The other elements of Equations (7) and (8) are the same as those discussed above with regard to the conjugate beamforming case.

After determining the number of active antennas $M_j$ for the Massive MIMO base station 120j at step S402, the transceiver circuitry 300 communicates the calculated number of active antennas $M_j$ to the Massive MIMO base station 120j at step S404. In one example, the transceiver circuitry 300 sends the calculated number of active antennas to the base station 120j. The transceiver circuitry 300 may send the calculated number of active antennas to the Massive MIMO base station 120j using any known control channel (either wired or wireless). Because control channels such as this are known, a detailed discussion is omitted.

In response to receiving the calculated number of active antennas, at step S406 the processor 202 at the Massive MIMO base station 120j activates the calculated number of antennas M from among the M antennas of the antenna array 210. The Massive MIMO base station 120j may activate the antennas in any well-known manner.

At step S408, the base station 120j begins (or continues existing) serving of and/or communication with users using the activated $M_j$ number of antennas.

According to at least some example embodiments, the central node may determine a number (e.g., optimal number) of active antennas to be used at all Massive MIMO base stations in a massive MIMO system based on overall wireless network parameters of the Massive MIMO system. As mentioned above, the massive MIMO system may refer to a cluster of massive MIMO base stations located in a given geographical coverage area (e.g., located relatively close to one another geographically). According to at least this example embodiment, the number (e.g., optimal number) of active antennas to be used at each of the base stations may be the same or substantially the same, with relatively little or no loss in energy efficiency.

Figure 5:
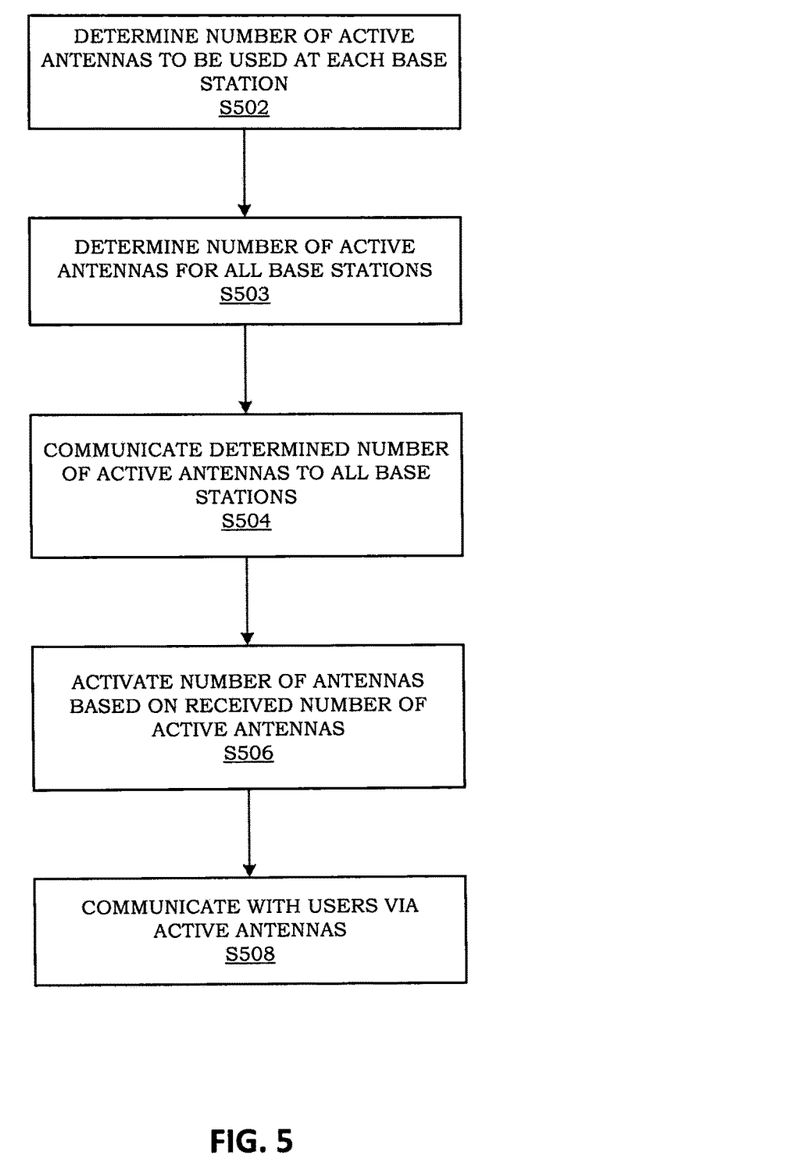
FIG. 5 is a flow chart illustrating an example embodiment of a method for determining a number of active antennas to be used at a plurality of massive MIMO base stations in a Massive MIMO system.

FIG. 5 is a flow chart illustrating an example embodiment of a method for determining an active number of antennas to be used at a plurality of Massive MIMO base stations in a Massive MIMO system. For example purposes, the method shown in FIG. 5 will be discussed with regard to the Massive MIMO system shown in FIG. 1, the Massive MIMO base station 120j shown in FIG. 2, and the central node 100 shown in FIG. 3. However, example embodiments should not be limited to this example.

Moreover, in some cases, the example embodiment shown in FIG. 5 will be discussed with regard to a single one of the Massive MIMO base stations shown in FIG. 1. However, it should be understood that each of the plurality of Massive MIMO base stations may operate in the same or substantially the same manner. That is, for example, example embodiments may be equally applicable to each of the plurality of Massive MIMO base stations shown in FIG. 1. Moreover, although example embodiments may be discussed with regard to the three base stations shown in FIG. 1, it should be understood that example embodiments may be applicable to a cluster of any number of massive MIMO base stations.

Furthermore, although the method shown in FIG. 5 may be discussed with regard to determining a number of active antennas $M_j$ for the $j^{th}$ base station 120j among the J base stations shown in FIG. 1, it should be understood that the same or substantially the same operations may be performed at each of the J base stations in determining the number of antennas to be used at the J base stations.

Referring to FIG. 5, at step S502 the processor 302 calculates an estimated number of active antennas to be used at each of the J massive MIMO base stations in the massive MIMO system. As with the example embodiment shown in FIG. 4, the central node 100 may determine the number of active antennas to be used at the Massive MIMO base stations using algorithms based on conjugate beamforming or zero forcing, each of which will be discussed in more detail below.

In the conjugate beamforming case, for the jth cell and base station 120j, the processor 302 determines the number of active antennas $M_j$ based on numerical quantities $d^{cb}$ and $C_j$ determined as discussed in more detail below. Numerical quantities $d^{cb}$ and $C_j$ are derivative quantities, which may be obtained from a mathematical optimization process. In some cases, the numerical quantities $d^{cb}$ and $C_j$ may be referred to as optimization parameters. In one example, the processor 302 may calculate the number of active antennas $M_j$ to be used at the Massive MIMO base station 120j according to Equation (9) shown below:

$$M_j = C_j \cdot (e^{(W(d^{cb})+1)} - 1) \qquad (9).$$

In Equation (9), $W(d^{cb})$ is the Lambert W function. In one example, the central node 100 calculates $d^{cb}$ based on a total radiated power of the jth Massive MIMO base station 120j, the power parameter A, the per antenna power cost other than radiated power for conjugate beamforming at the Massive MIMO base station 120j, and the numerical quantity (or optimization parameter) $C_j$. In one example, the central node 100 may calculate the numerical quantity $d^{cb}$ according to Equation (10) shown below:

$$d^{cb} = \frac{P_{rad} \cdot A}{B_j \cdot C_j} - 0.368. \qquad (10)$$

In Equation (10), $P_{rad}$ is the total radiated power of the jth base station 120j, and the numerical quantity $C_j$ is given by Equation (11) shown below:

$$C_j = \frac{1}{\rho_{d^{cb}}} \sum_{k=1}^{K_j} \frac{1}{\gamma_{jk}} + \sum_{k=1}^{K_j} \frac{1}{\gamma_{jk}} \sum_{i=1}^{J} \beta_{i;jk}. \qquad (11)$$

In Equation (11), $\rho_{d^{cb}}$ is the normalized downlink Signal-to-Noise Ratio (SNR) with respect to downlink noise power at the k-th user in the jth cell, and i is an index representing the neighboring cells in the Massive MIMO system shown in FIG. 1. In this example, the index i takes the values of n (for the $n^{th}$ cell) and l (for the $l^{th}$ cell).

In the zero-forcing case, for the jth cell the processor 302 determines the number of active antennas $M_j$ to be used at the Massive MIMO base station 120j based on the number of simultaneous users in the $j^{th}$ cell and numerical quantities $d^{zf}$, $C_j$, and f determined as discussed herein. Numerical quantity $C_j$ is the same as that discussed above. Similar to numerical quantity $d^{cb}$ for the conjugate beamforming case, numerical quantity $d^{zf}$ is a derivative quantity, which may be obtained from a mathematical optimization process. Numerical quantity f may also be obtained from a mathematical optimization process.

The numerical quantities $d^{zf}$, $C_j$ and f may be referred to as optimization parameters.

In one example, the processor 302 may compute the number of active antennas $M_j$ according to Equation (12) shown below:

$$M_j = (C_j - K_j)(e^{(W(d^{zf})+1)} - f) \qquad (12).$$

In Equation (12), $W(d^{zf})$ is again the Lambert W function, and $d^{zf}$, f and $C_j$ are the numerical quantities discussed above.

In one example, the processor may calculate $d^{zf}$ based on a total radiated power of the Massive MIMO base station 120j, the power parameter A, the per antenna power cost other than radiated power for the zero-forcing at the base station 120j, the number of simultaneous users in the $j^{th}$ cell, and the numerical quantity (or optimization parameter) $C_j$. In one example, the processor 302 may calculate $d^{zf}$ according to Equation (13) shown below:

$$d^{zf} = \frac{P_{rad} \cdot A}{B_j \cdot (C_j - K_j)} - 0.368 \cdot \left(1 - \frac{K_j}{C_j - K_j}\right). \quad (13)$$

Still referring to Equation (12), f may be given by Equation (14) shown below:

$$f = 1 - \frac{K_j}{C_j - K_j} \quad (14)$$

As mentioned above, $K_j$ is the number of simultaneous users in the jth cell.

The central node 100 may repeat the calculations mentioned above for each of the J base stations in the Massive MIMO system. The calculations for each of the J base stations may be performed sequentially or in parallel.

Returning to FIG. 5, after calculating the number of active antennas to be used at each of the J Massive MIMO base stations, at step S503 the central node 100 determines a number of active antennas $x_{avg}$ to be used at all J base stations based on the calculated number of active antennas to be used at each individual Massive MIMO base station.

In one example, the processor 302 calculates a number (e.g., optimal number) of service antennas to be used at all Massive MIMO base stations in the Massive MIMO system as an average of the numbers of antennas $M_j$ calculated at step S502. In more detail, the processor 302 may calculate the number of service antennas $x_{avg}$ for all Massive MIMO base stations according to Equation (15) shown below:

$$x_{avg} = \frac{1}{J} \sum_{j=1}^{J} M_j \quad (15)$$

Returning again to FIG. 5, after calculating the number of service antennas $x_{avg}$ to be used at the J Massive MIMO base stations, the transceiver circuitry 300 communicates the calculated number of active antennas to each of the J Massive MIMO base stations at step S504. In this example, the transceiver circuitry 300 may communicate the calculated number of active antennas via any known control and/or broadcast channel.

In response to receiving the calculated number of active antennas, the processor 202 at each of the J Massive MIMO base stations activates the calculated number of antennas from among the M antennas of the antenna array 210 at step S506. The Massive MIMO base stations may activate the antennas in any well-known manner. Although M is used to denote the number of antennas at each of the J Massive MIMO base stations, it should be understood that the J Massive MIMO base stations may have different numbers of antennas.

Still referring to FIG. 5, at step S508 each of the J Massive MIMO base station begins serving (or continues serving) and/or communicating with users in their respective cells using the activated $x_{avg}$ number of antennas.

According to one or more example embodiments, by dynamically adjusting the number of active antennas at each Massive MIMO base station for a given radiated power level for each massive MIMO base station, the massive MIMO system may improve (e.g., maximize) energy efficiency of the network.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for configuring a number of active antennas of at least one Massive Multiple-Input-Multiple-Output (MIMO) base station to be used to serve users in at least one cell of a Massive MIMO system including a plurality of cells and a plurality of corresponding Massive MIMO base stations, the method comprising:
   determining, at a central node connected to and located remotely from the at least one Massive MIMO base station, the number of active antennas of the at least one Massive MIMO base station to be used to serve the users in the at least one cell of the Massive MIMO system based on wireless network parameters for the Massive MIMO system;
   transmitting, by the central node, the number of active antennas to the at least one Massive MIMO base station in the at least one cell; and
   wherein the determining includes
      calculating an estimated number of active antennas to serve users in each of the plurality of cells based on the wireless network parameters for the Massive MIMO system; and
      computing the number of active antennas to be used for serving users in the at least one cell of the Massive MIMO system based on the estimated numbers of active antennas.

2. The method of claim 1, wherein the wireless network parameters include at least one of fading characteristics for the at least one Massive MIMO base station and traffic loading information for the Massive MIMO system.

3. The method of claim 2, wherein the fading characteristics include slow fading coefficients associated with the at least one Massive MIMO base station.

4. The method of claim 2, wherein the traffic loading information includes traffic loading demand for the plurality of corresponding Massive MIMO base stations in the Massive MIMO system.

5. The method of claim 1, wherein
   the calculating includes separately calculating the estimated number of active antennas for serving users in each of the plurality of cells based on the wireless network parameters for the Massive MIMO system.

6. The method of claim 1, wherein the computing step comprises:

calculating an average of the estimated numbers of active antennas to compute the number of active antennas to be used to serve users in the at least one cell of the Massive MIMO system.

7. The method of claim 6, wherein the transmitting step transmits the calculated average to each of the plurality of cells in the Massive MIMO system.

8. The method of claim 1, further comprising:
dynamically adjusting the number of active antennas to be used to serve users in the at least one cell by performing the determining step and the transmitting step periodically.

9. A central node of a Massive Multiple-Input-Multiple-Output (MIMO) system including a plurality of cells and a plurality of corresponding Massive MIMO base stations, the central node comprising:
a processor configured to
calculate an estimated number of active antennas for serving users in each of the plurality of cells based on wireless network parameters for the Massive MIMO system, and
compute a number of active antennas of at least one Massive MIMO base station to be used to serve users in at least one cell of the Massive MIMO system based on the estimated numbers of active antennas, the central node connected to and located remotely from the at least one Massive MIMO base station; and
a transceiver configured to transmit the number of active antennas to the at least one Massive MIMO base station in the at least one cell.

10. The central node of claim 9, wherein the wireless network parameters include at least one of fading characteristics for the at least one Massive MIMO base station and traffic loading information for the Massive MIMO system.

11. The central node of claim 10, wherein the fading characteristics include slow fading coefficients associated with the at least one Massive MIMO base station.

12. The central node of claim 10, wherein the traffic loading information includes traffic loading demand for the plurality of corresponding Massive MIMO base stations in the Massive MIMO system.

13. The central node of claim 9, wherein
the processor is further configured to
separately calculate the estimated number of active antennas for serving users in each of the plurality of cells based on the wireless network parameters for the Massive MIMO system.

14. The central node of claim 9, wherein the processor is further configured to compute the number of active antennas to be used to serve users in the at least one cell of the Massive MIMO system by calculating an average of the estimated numbers of active antennas.

15. The central node of claim 14, wherein the transceiver is further configured to transmit the calculated average to each of the plurality of cells in the Massive MIMO system.

16. The central node of claim 9, wherein the central node is configured to dynamically adjust the number of active antennas to be used to serve users in the at least one cell by performing the determining step and the transmitting step periodically.

17. A non-transitory computer-readable medium including computer-executable instructions that, when executed by a computer device, cause the computer device to perform a method for configuring a number of active antennas of at least one Massive Multiple-Input-Multiple-Output (MIMO) base station to be used to serve users in at least one cell of a Massive MIMO system including a plurality of cells and a plurality of corresponding Massive MIMO base stations, the method comprising:
determining, at a central node connected to and located remotely from the at least one Massive MIMO base station, the number of active antennas of the at least one Massive MIMO base station to be used to serve the users in the at least one cell of the Massive MIMO system based on wireless network parameters for the Massive MIMO system;
transmitting, by the central node, the number of active antennas to the at least one Massive MIMO base station in the at least one cell; and
wherein the determining includes
calculating an estimated number of active antennas for serving users in each of the plurality of cells based on the wireless network parameters for the Massive MIMO system, and
computing the number of active antennas to be used to serve users in the at least one cell of the Massive MIMO system based on the estimated numbers of active antennas.

18. The non-transitory computer-readable medium of claim 17, wherein
the calculating includes separately calculating the estimated number of active antennas for serving users in each of the plurality of cells based on the wireless network parameters for the Massive MIMO system.

19. The non-transitory computer-readable medium of claim 17, wherein the computing step comprises:
calculating an average of the estimated numbers of active antennas to compute the number of active antennas to be used to serve users in the at least one cell of the Massive MIMO system.

20. The non-transitory computer-readable medium of claim 17, wherein the method further comprises:
dynamically adjusting the number of active antennas to be used to serve users in the at least one cell by performing the determining step and the transmitting step periodically.

21. A base station configured to serve users in at least one cell of a Massive Multiple-Input-Multiple-Output (MIMO) system including a plurality of cells and a plurality of corresponding Massive MIMO base stations, the base station comprising:
a plurality of Massive MIMO antennas;
a backhaul data and signaling interface configured to receive a computed number of active Massive MIMO antennas to be used to serve users in the at least one cell served by the base station, the computed number of active Massive MIMO antennas computed based on an estimated number of active Massive MIMO antennas to be used to serve users in each of the plurality of cells, the estimated number of active Massive MIMO antennas calculated based on wireless network parameters for the Massive MIMO system;
a processor configured to activate the computed number of active Massive MIMO antennas; and
a transceiver configured to communicate with the users using the activated number of Massive MIMO antennas.

22. A method for serving users in at least one cell served by a base station in a Massive Multiple-Input-Multiple-Output (MIMO) system including a plurality of cells and a plurality of corresponding Massive MIMO base stations, the method comprising:

receiving, from a central node, a computed number of active Massive MIMO antennas to be used to serve users in the at least one cell served by the base station, the computed number of active Massive MIMO antennas computed based on an estimated number of active Massive MIMO antennas to be used to serve users in each of the plurality of cells, the estimated number of active Massive MIMO antennas calculated based on wireless network parameters for the Massive MIMO system;

activating the computed number of active Massive MIMO antennas; and communicating with the users using the activated number of Massive MIMO antennas.

23. A non-transitory computer-readable medium including computer-executable instructions that, when executed by a computer device, cause the computer device to perform a method for serving users in at least one cell served by a base station in a Massive Multiple-Input-Multiple-Output (MIMO) system including a plurality of cells and a plurality of corresponding Massive MIMO base stations, the method comprising:

receiving, from a central node, a computed number of active Massive MIMO antennas to be used to serve users in the at least one cell served by the base station, the computed number of active Massive MIMO antennas computed based on an estimated number of active Massive MIMO antennas to be used to serve users in each of the plurality of cells, the estimated number of active Massive MIMO antennas calculated based on wireless network parameters for the Massive MIMO system;

activating the computed number of active Massive MIMO antennas; and communicating with the users using the activated number of Massive MIMO antennas.

\* \* \* \* \*